(12) United States Patent
Pratap

(10) Patent No.: US 12,436,345 B2
(45) Date of Patent: Oct. 7, 2025

(54) IMMERSION COMPATIBLE OPTICAL INTERCONNECT

(71) Applicant: Intel Corporation, Santa Clara, CA (US)

(72) Inventor: Divya Pratap, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 17/556,326

(22) Filed: Dec. 20, 2021

(65) Prior Publication Data

US 2023/0194809 A1 Jun. 22, 2023

(51) Int. Cl.
*H04B 10/00* (2013.01)
*G02B 6/42* (2006.01)

(52) U.S. Cl.
CPC ......... *G02B 6/4253* (2013.01); *G02B 6/4245* (2013.01); *G02B 6/4261* (2013.01)

(58) Field of Classification Search
CPC .. G02B 6/4253; G02B 6/4245; G02B 6/4261; G02B 6/4251; G02B 6/4292; G02B 6/4248; G02B 6/4268; G02B 6/4269
See application file for complete search history.

(56) References Cited

U.S. PATENT DOCUMENTS

| | | | | |
|---|---|---|---|---|
| 10,634,852 B1* | 4/2020 | Hsia | ..................... | G02B 6/3624 |
| 10,775,575 B1* | 9/2020 | Hsia | ..................... | G02B 6/3624 |
| 2006/0029338 A1* | 2/2006 | Rodriguez-Parada | | G02B 6/4248 |
| | | | | 385/94 |
| 2007/0189677 A1* | 8/2007 | Murry | .................. | G02B 6/4279 |
| | | | | 385/92 |
| 2009/0207627 A1* | 8/2009 | Engel | ..................... | B60Q 1/305 |
| | | | | 362/555 |
| 2010/0092142 A1* | 4/2010 | Walsh, III | ............ | G02B 6/3897 |
| | | | | 385/138 |
| 2010/0166366 A1* | 7/2010 | Grapov | .................... | G02B 6/32 |
| | | | | 385/52 |
| 2011/0158594 A1* | 6/2011 | Yalamanchili | ....... | G02B 6/4248 |
| | | | | 385/94 |
| 2011/0170833 A1* | 7/2011 | Moidu | ................. | G02B 6/4248 |
| | | | | 385/94 |
| 2013/0298392 A1* | 11/2013 | Carralero | ................. | G02B 6/30 |
| | | | | 29/825 |
| 2014/0231133 A1* | 8/2014 | Fritz | ...................... | G21C 13/06 |
| | | | | 174/650 |
| 2016/0091684 A1* | 3/2016 | Van Cauteren | ...... | G02B 6/3897 |
| | | | | 385/135 |
| 2016/0266335 A1* | 9/2016 | Durrant | ................ | G02B 6/4251 |
| 2019/0310160 A1* | 10/2019 | Moriyama | ............ | G01M 11/30 |
| 2019/0346638 A1* | 11/2019 | Suehiro | ................ | G02B 6/4206 |
| 2019/0372303 A1* | 12/2019 | Miyokawa | .......... | H01S 5/02253 |

(Continued)

*Primary Examiner* — Agustin Bello
(74) *Attorney, Agent, or Firm* — Essential Patents Group, LLP

(57) ABSTRACT

A fluid compatible electro-optical packages and associated systems and devices are shown. For example, a fluid compatible electro-optical package includes integrated circuits with at least one photonic die and optical connections coupled with the integrated circuit. In an example, optical fibers are coupled with the optical connection. In an example fluid compatible electro-optical package, a fluid impermeable port is coupled with the optical connection and the optical fibers couple with the optical connection within the fluid impermeable port.

20 Claims, 5 Drawing Sheets

(56) References Cited

U.S. PATENT DOCUMENTS

| | | | | |
|---|---|---|---|---|
| 2020/0026010 A1* | 1/2020 | Iwama | ............... | G02B 6/4268 |
| 2020/0379164 A1* | 12/2020 | Clatanoff | ............ | G02B 6/4268 |
| 2021/0104865 A1* | 4/2021 | Hu | ....................... | H01S 5/4087 |
| 2022/0350089 A1* | 11/2022 | Puffer | ................. | G02B 6/4253 |
| 2023/0194809 A1* | 6/2023 | Pratap | ................ | G02B 6/4251 |
| | | | | 385/88 |
| 2023/0393005 A1* | 12/2023 | Lopushansky | ....... | G01L 9/0079 |
| 2023/0393355 A1* | 12/2023 | Zbinden | ............. | G02B 6/4278 |
| 2024/0302608 A1* | 9/2024 | Girlando | ............. | G02B 6/4214 |

* cited by examiner

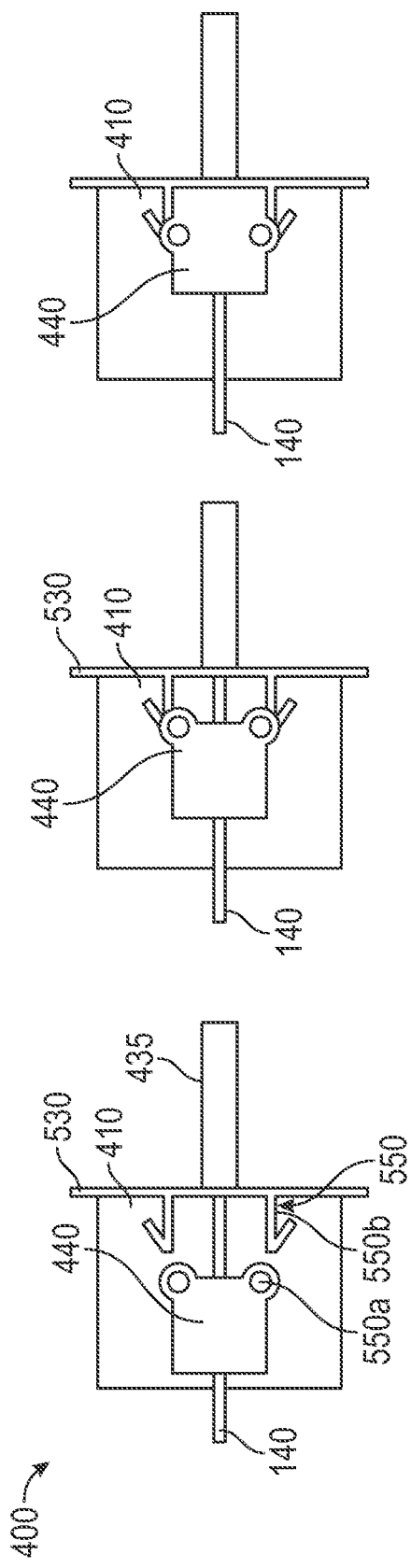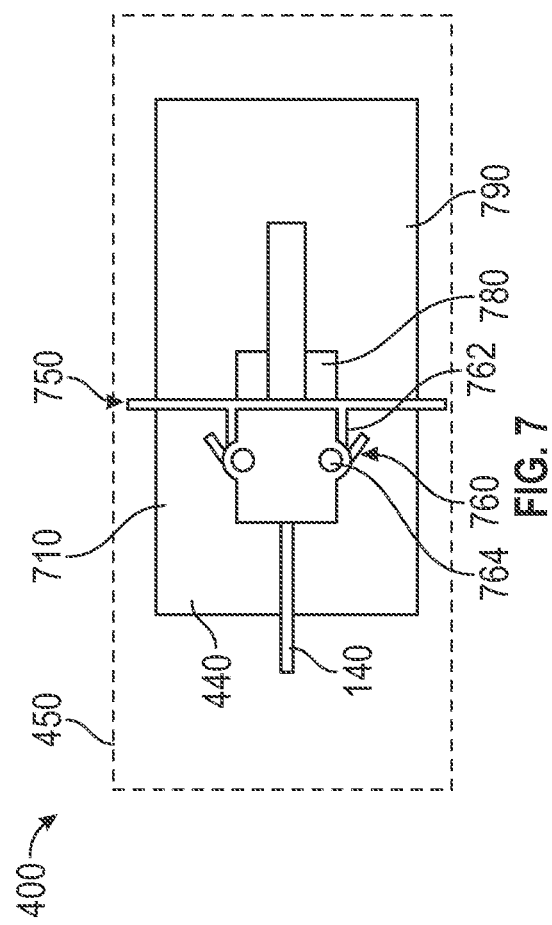

IMMERSION COMPATIBLE OPTICAL INTERCONNECT

TECHNICAL FIELD

This document pertains generally, but not by way of limitation, to fluid compatible electro-optical packaging with a fluid impermeable port.

BACKGROUND

Computer chips, and other similar components for computer systems give off heat when in use. Excess heat causes computer components to malfunction. One type of computer component includes chips having optical connections. In some examples, optical fibers are coupled to, or fabricated on, a surface of a chip. In an example, chips with optical fibers are cooled using a heat exchanger or subjecting the computer components to cooling airflow.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6a-6c are examples of stages of insertion of a fluid impermeable port on an optical package system.

FIG. 7 is an example of an optical package system with fluid impermeable port.

DETAILED DESCRIPTION

Figure 1:
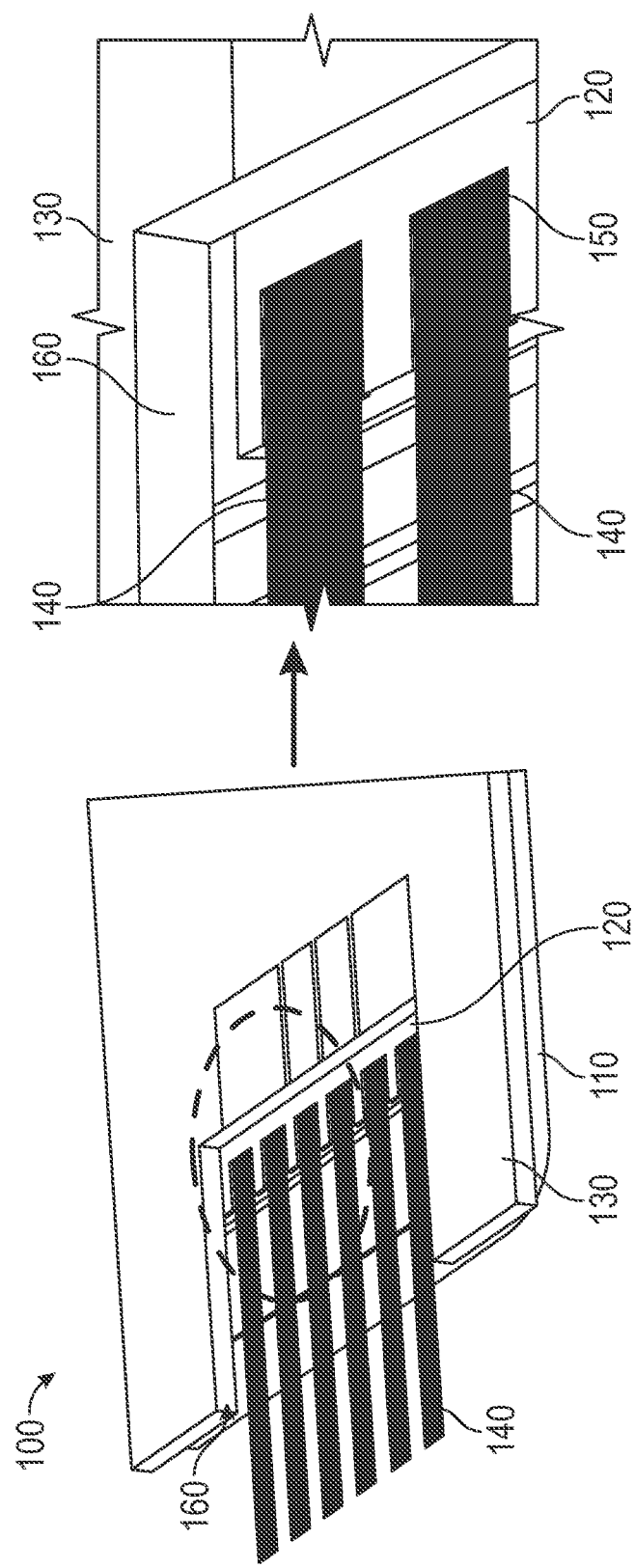
FIGS. 1a and 1b are an example illustration of optical package system.

In computer systems and other electronic systems, heat is generated when the system is in use. For proper operation of a system, excess heat, or waste heat, needs to be removed. Overheated components, such as integrated circuits, chipsets, hard drives, and central processing units can malfunction or become damaged if subjected to excess heat.

Heatsinks or fans are examples of devices used to cool computer components in ambient air conditions. These mechanical devices dissipate heat generated by the components away from other the computer or electronic systems and transfers the heat into the environment. The heat dissipation allows the computer's or electronic system's temperatures to be regulated at optimal operating temperatures. Using a heatsink cooled by airflow reduces the temperature in the system. The material which needs cooling has a structure to increase the surface area and allow for more efficient radiation of heat away from the system. A fan or heatsink can be used to regulate the system's temperature by dissipating the excess into the air. A fan generates airflow which cools the system components. Computer fans are typically used to assist in the reduction of temperature. Exhaust fans can also be used to remove heat from a system.

In other examples, a liquid cooling agent can be used to regulate temperature of computer or electronic systems. It has been recognized that liquid cooling is an efficient and effective method of removing waste heat from systems. Liquid cooling is, in some examples, more advantageous over air cooling because of certain liquids' high specific heat capacity and thermal conductivity.

In an active liquid cooling system, the liquid cooling agent is circulated by a pump, or similar mechanism, around the computer or electronic components. In other examples of a liquid cooling system, the cooling system is a passive system which operates without the use of a pump or a fan. Passive cooling systems cool by evaporation or other reactions to move the liquid.

A chip package is a housing in which integrated circuits or chips are placed. The package supports the electrical contacts which connect integrated circuits or chips. The package is then either plugged into or soldered onto the printed circuit board. One example package is an optical package. In an example, an optical package is a housing containing the components of an integrated circuit which use light to transmit signals.

For example, an optical package includes connection points for optical fibers or cables. The optical fibers enter the optical package and couple to a die on the substrate of an optical system. The optical fibers transmit data using light from a source to a receiving end. In one example, the transmitted data is a binary communication through an electro-optical connection. In another example, the transmitted data is carried by light signal. Single-mode or multi-mode optical fibers are used to transmit data according to the specified purpose. The use of "optical fiber" refers to electro-optical connections and single-mode or multi-mode optical fibers.

As illustrated in FIGS. 1a and 1b, an optical package system 100 is shown which could be included with an integrated circuit. The optical package system 100 in some examples is an electro-optical package. Hereinafter, optical package system 100 will refer to any similar system including, but not limited to, electro-optical packages. The optical package system 100 includes, for example a substrate 110, a die 120, and an integrated heat spreader (IHS) 130. The IHS 130, in some examples, covers the die 120. The optical package system 100 can include optical fibers 140 and an optical connection 150 which couples the optical fibers 140 with the die 120.

Figure 2:
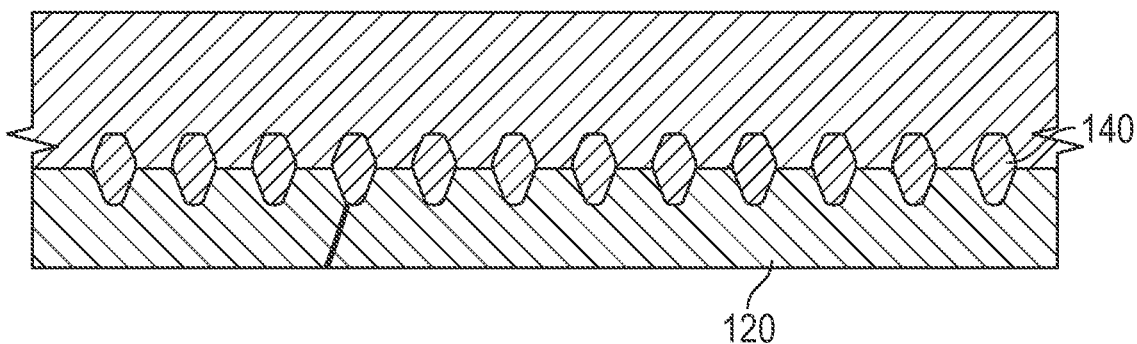
FIG. 2 is an example close-up cross section view of optical fibers on a die.

FIG. 2 illustrates a magnified view of the interconnect of the optical fibers 140 coupled with the die 120. The optical fibers 140 in this example are at least partially exposed. In an example, the optical fibers 140 are coupled with the die 120 at the optical connection 150.

In an example illustrated in FIGS. 1a and 1b, the optical package system 100 includes a cutout 160 formed in the IHS 130. The optical package system 100 in one example provides a pathway for the optical fibers 140 to connect with the optical connection 150 within the cutout 160. The cutout 160 can be any specified shape and dimension according to the specified purpose. The cutout 160 is an opening, recess, notch in the IHS for the optical fibers 140 to connect with the die 120. In an example, the die 120 is made from silicon or another semiconductor determined by the specified purpose. In an example, the die 120 is a photonic silicon die.

Figure 3A:
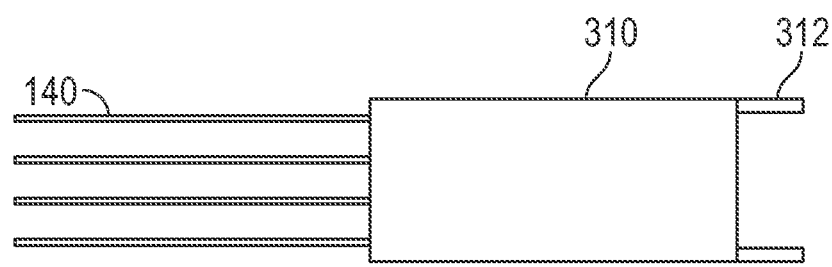
FIG. 3a is an example of an arrangement of optical fibers.

The optical fibers can be arranged in any manner according to the specified purpose, such as horizontally or vertically. In an example shown in FIG. 3a, the optical fibers 140 are arranged in a generally horizontal arrangement. The optical fibers 140 arranged in a horizontal arrangement are coupled with the die 120 and the optical package system 100 through a horizontal attachment unit 310. The horizontal attachment unit 310 has horizontal alignment pins 312 on a side opposing the side which couples with the optical fibers 140.

Figure 3B:
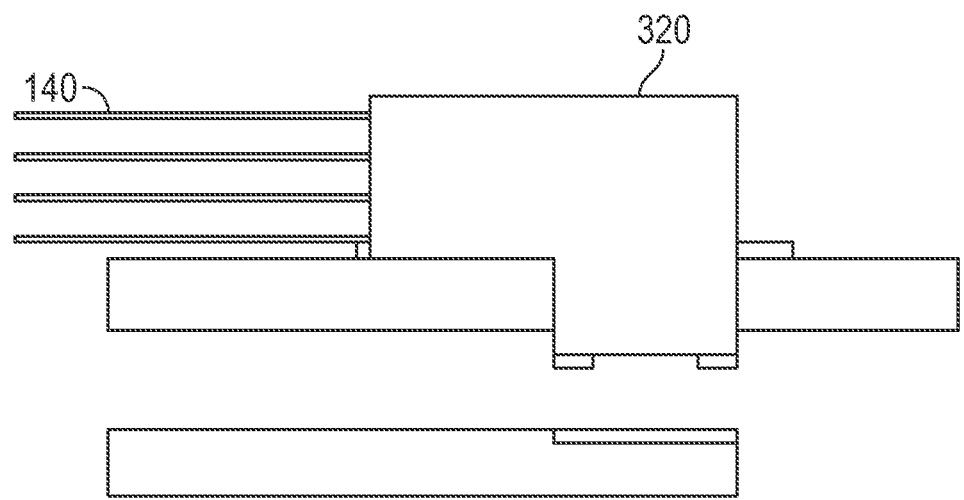
FIG. 3b is an example of an arrangement of optical fibers with an optical package system.

In an example shown in FIG. 3b, the optical fibers 140 are coupled with an attachment unit 320 that penetrates the IHS in a vertical alignment. The optical fibers 140 in a vertical arrangement are coupled with the die 120 and the optical package system 100 through a vertical attachment unit 320. The vertical attachment unit 320 is a shape which allows for vertical alignment pins 314 to be coupled with the optical package system at a point which, for example, passes through the IHS 130.

Figure 4:
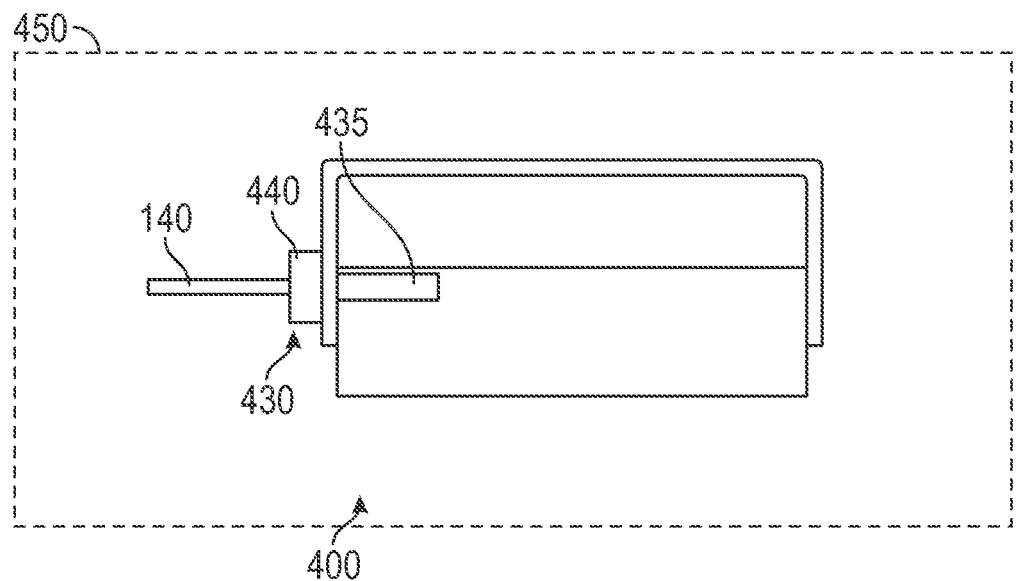
FIG. 4 is an example of an optical package system in an immersion fluid.

In an example shown in FIG. 4, an immersion fluid 450, or fluid coolant, is used to remove heat from an optical package system 400 and thereby cool it. The immersion fluid is part of an immersion cooling system. The integrated circuit, including the optical package system 400 can be cooled with water, synthetic oil or any coolant liquid for the specified purpose as the immersion fluid 450. In an example where immersion fluid 450 is used to cool the optical package system 400, the optical package system 400 is dipped or placed temporarily inside the immersion fluid 450 to cool it. In another example, the optical package system 400 is placed so it remains immersed in the immersion fluid 450. When the optical package system 400 is exposed to the immersion fluid 450, the electrical and optical components need to continue functioning and be operable. However, the electrical and optical components can be damaged when exposed to a fluid. Areas exposed to the immersion fluid can be protected from the immersion fluid with seals, couplings, barriers and other materials and mechanism so such areas are not damaged or otherwise compromised by the immersion fluid.

In the example optical package system 400 shown in FIG. 4 an attachment unit 430 is shown. The attachment unit 430 includes at least a fluid impermeable port 440 and a coupling unit 435. The optical fiber 140 passes through the fluid impermeable port 440 to be attached to the die.

When the optical package system 400 is used in an environment where the immersion fluid 450 is present, the optical connection can be protected with the fluid impermeable port 440 (e.g. seal, plug, socket, barrier, or cover). The fluid impermeable port 440 forms a seal or fluid impermeable barrier between the surrounding immersion fluid 450 and the electrical and optical components coupled with and to the optical package system 400. The fluid impermeable port 440, for example, is made from a material which forms to irregularities in surfaces of the components while also being of a size and dimension to fit within any gaps between mating components. Sealing materials which can be compressed or expanded to fit into microscopic irregularities in associated surfaces are desired. As, in an example, when the material is compressed when an external force is applied, the microscopic irregularities are closed, filled or capped, so fluid cannot pass through any holes or openings when the optical package system is immersed in a fluid.

In an example, the fluid impermeable port 440 is made from any polymer-based material, such as polypropylene, natural or synthetic rubber, or any compressible material designed for the specified purpose. Polymers such as polypropylene and rubbers which deform easily yet have elasticity to return to close to its original shape. When such polymers are subjected to a compressive deformation force, the molecular structure will return to close to its original form when areas of the material are not subject to deformation forces. The areas not subjected to compressive deformation forces will expand or return to its original form; thereby filling any gaps or openings where fluid may permeate. The compressible material chosen, for example, closes, fills or caps any gaps between mating surfaces when a force is applied to the compressible material. For example, the selected material deforms to form an interference fit between the mating surfaces.

Polymers such as polypropylene and rubber, both natural and synthetic, are also moisture resistant. These materials prevent fluid from passing, seeping or otherwise permeating. In an example, the material selected for the fluid impermeable seal fills, closes or otherwise seal any gaps while also preventing fluid from permeating the material itself.

Figure 5:
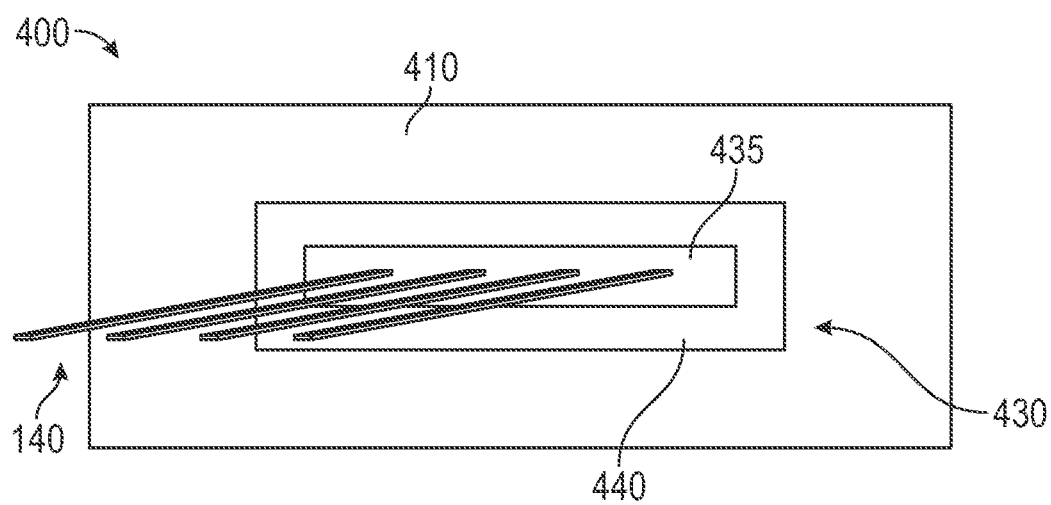
FIG. 5 is an example of an optical package system with fluid impermeable port.

FIG. 5 illustrates an example of the coupling unit 435 shown within the fluid impermeable port 440 on the IHS 410. In this example, the optical fibers 140 pass through the fluid impermeable port 440. The optical fibers 140 can connect with the optical connection protected by fluid impermeable port 440.

A latching mechanism is one coupling mechanism contemplated to apply pressure or a force to the fluid impermeable port 440 to assist in forming the seal or barrier. FIG. 6a-FIG. 6c illustrates an example of insertion of a latching mechanism 550. The latching mechanism 550 includes, at least, the fluid impermeable port 440 and the IHS 410 have opposing latching mechanism portions 550a and 550b. For example, one side of the latching mechanism 550a (fluid impermeable port latch) is on the fluid impermeable port 440 and the other side of the latching mechanism 550b (adapter latch) is on an adapter 530 coupled to the IHS 410. As the fluid impermeable port 440 is pulled towards or otherwise inserted into the adapter 530, as illustrated in FIG. 6b, the fluid impermeable port latch 550a engages with the adapter latch 550b causing a compressive force between the fluid impermeable port 440 and the adapter 530. As illustrated in the example shown in FIG. 6c, the compressive force deforms and compresses the fluid impermeable port and forms a fluid impermeable seal between the fluid impermeable port 440 and the adapter 530.

The fluid impermeable port 440 couples with the coupling unit 435, an IHS 410 or at any other portion of the optical package system 400 with any mechanical means specified for the purpose. The mechanism which couples the fluid impermeable port 440, for example, forms a seal or barrier between the fluid impermeable port and the optical components on the optical package system 400.

In an example, the latching mechanism 550 is a male-female engagement, a hook and eye engagement, opposing hooks, a bayonet-type fastener, hook and roller fastener, opposing T-shaped hooks, or any other latching engagement where a compression force results from the engagement of the opposing sides.

In an example the fluid impermeable port 440, when fully installed, meets with the adapter 530 and thereby covers and protects the optical connection 150. The optical fibers 140 pass through the fluid impermeable port 440 and couple with the optical connection 150 on the die 120. The optical connection 150 is within the cutout 160 and is an example location in the optical package system 400 where the optical fibers 140 are exposed to the immersion fluid 450 and the optical connection 150 on the die 120. In an example with the fluid impermeable port 440 attached to the attachment unit 430, the immersion fluid 450 will not interact with the optical fibers 140 at the optical connection 150. Therefore, the fluid impermeable port 440 acts as a barrier to the immersion fluid 450.

In another example, the optical connection can occur outside of the IHS. An adapter unit and fluid impermeable port are used and coupled to the optical connection on the die at a location specified by the purpose.

In another example, the optical connection can occur on a die but not within a cutout in the IHS. An adapter and fluid impermeable port can be used to protect the optical connection from any immersive. In an example where the immersive fluid interacts with the optical package system 100 at the optical connection 150, the index of refraction is altered. When the index of refraction is altered, the signals communicated through the optical fibers are altered. Therefore, the fluid impermeable port 440 is necessary to protect this intersection of the optical fibers 140 with the die 120 at the optical connection 150. The optical fibers 140 outside of the area of the optical connection 150 can be exposed to the immersive fluid or protected from the immersive fluid according to the specified design.

In an example, an existing optical package system is modified to accommodate a system with a fluid impermeable port. For example, a latching mechanism 750 is added to the existing IHS, as illustrated in FIG. 7, near the optical connection 780 on the substrate 790. The latching mechanism 750 added to the IHS can include a first part of a latch 762. The fluid impermeable port 440 has an opposing second part of a latch 764 on the adapter. When the latch 764 on the fluid impermeable port 440 couples with the latch 762 on the adapter, the fluid impermeable port 440 compresses and forms a seal or barrier to the immersion fluid 450. The compression of the fluid impermeable port 440 can form a seal which protects the optical connection 780 from exposure to the immersion fluid.

Figure 8:
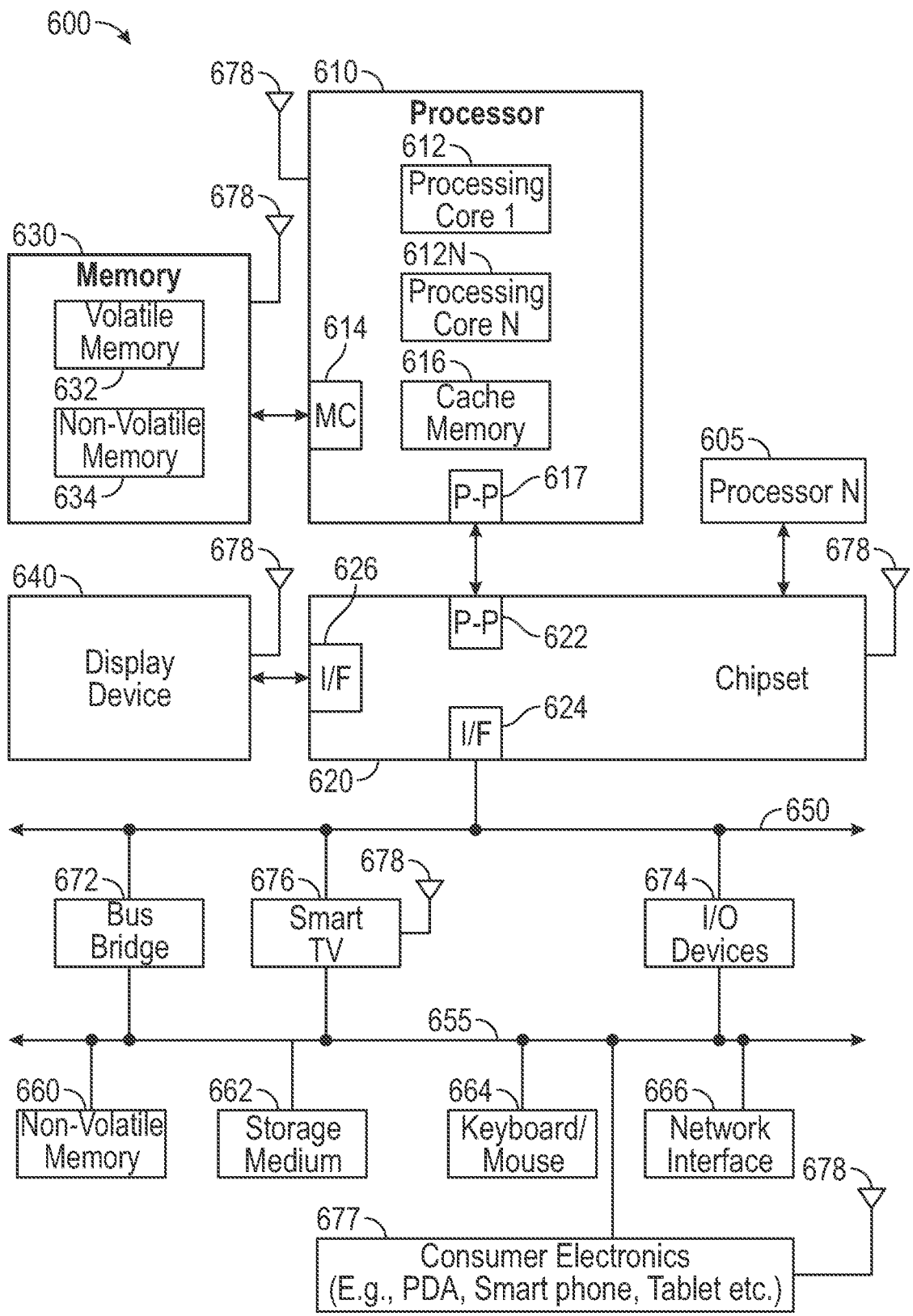
FIG. 8 is an example of a system level diagram, depicting an example of an electronic device (e.g., system) including a substrate containing a magnetic inductor device.

FIG. 8 illustrates a system level diagram, depicting an example of an electronic device (e.g., system) that may include a substrate containing an optical package system and which is formed, for example, from any of the example process flows described above. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 includes a system on a chip (SOC) system.

In one embodiment, processor 610 has one or more processor cores 612 and 612N, where 612N represents the Nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, an interface for wireless antenna 678 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments of the example system, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processor 610, 605N, display device 640, and other devices, including a bus bridge 672, a smart TV 676, I/O devices 674, nonvolatile memory 660, a storage medium (such as one or more mass storage devices) 662, a keyboard/mouse 664, a network interface 666, and various forms of consumer electronics 677 (such as a PDA, smart phone, tablet etc.), etc. In one embodiment, chipset 620 couples with these devices through an interface 624. Chipset 620 may also be coupled to a wireless antenna 678 to communicate with any device configured to transmit and/or receive wireless signals. In one example, any combination of components in a chipset may be separated by a continuous flexible shield as described in the present disclosure.

Chipset 620 connects to display device 640 via interface 626. Display 640 may be, for example, a liquid crystal display (LCD), a light emitting diode (LED) array, an organic light emitting diode (OLED) array, or any other form of visual display device. In some embodiments of the example system, processor 610 and chipset 620 are merged into a single SOC. In addition, chipset 620 connects to one or more buses 650 and 655 that interconnect various system elements, such as I/O devices 674, nonvolatile memory 660, storage medium 662, a keyboard/mouse 664, and network interface 666. Buses 650 and 655 may be interconnected together via a bus bridge 672.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) can be incorporated into processor core 612.

Various Notes and Aspects

Aspect 1 can include a fluid compatible electro-optical package including an integrated circuit with at least one photonic die. An optical connection is coupled with the integrated circuit and optical fibers are coupled with the optical connection. A fluid impermeable port is coupled with the optical connection. The optical fibers couple with the optical connection within the fluid impermeable port.

Aspect 2 can include, or can optionally be combined with the subject matter of Aspect 1, to optionally include the fluid impermeable port made from a polymer-based material.

Aspect 3 can include, or can optionally be combined with the subject matter of Aspect 1, to optionally include an integrated heat spreader covering the at least one photonic die.

Aspect 4 can include, or can optionally be combined with the subject matter of Aspect 1, to optionally include a cutout where the optical connection is coupled with the integrated circuit in the cutout.

Aspect 5 can include, or can optionally be combined with the subject matter of Aspect 1, to optionally include an integrated heat spreader covering at least the at least one photonic die, a first part of a latching mechanism coupled with the integrated heat spreader; and an opposing part of a latching mechanism coupled with fluid impermeable port.

Aspect 6 can include, or can optionally be combined with the subject matter of Aspect 1, to optionally include the integrated circuit including the at least one die is immersed in an immersion cooling system.

Aspect 7 can include an optical package system with an optical fiber system having an integrated circuit including an optical fiber connection. The optical fiber system connects to the integrated circuit at the optical fiber connection. A seal is around the optical fiber connection. The system also includes an immersion cooling system having an immersion fluid where the integrated circuit is immersed in the immersion cooling system and the seal is a fluid impermeable barrier around the optical fiber connection and optical system.

Aspect 8 can include, or can optionally be combined with the subject matter of Aspect 7, the seal being made from one of polypropylene, rubber, or synthetic rubber.

Aspect 9 can include, or can optionally be combined with the subject matter of Aspect 7, the integrated circuit includes an integrated heat spreader and a photonic die.

Aspect 10 can include, or can optionally be combined with the subject matter of Aspect 7 where the integrated heat spreader includes a cutout and the optical fiber system connects to the integrated circuit within the cutout.

Aspect 11 can include, or can optionally be combined with the subject matter of Aspect 7 includes a latching mechanism where the latching mechanism is coupled to the optical fiber connection.

Aspect 12 can include, or can optionally be combined with the subject matter above, where the latching mechanism provides a compressible force to the seal.

Aspect 13 can include, or can optionally be combined with the subject matter above, including an integrated heat spreader covering at least the at least one photonic die, a first part of a latching mechanism coupled with the integrated heat spreader, and an opposing part of a latching mechanism coupled with fluid impermeable port.

Aspect 14 can include an integrated optical connection system which has a photonic silicon die coupled to a substrate, an integrated heat spreader covering the photonic silicon die and including a cutout, optical fibers in communication with the photonic silicon die through the cutout, a compressible seal surrounding the optical fibers at a communication point with the internal silicon die, and a latching mechanism providing compression force to the compressible seal. The compression force provided to the compressible seal is a fluid barrier at the communication point.

Aspect 15 can include, or can optionally be combined with the subject matter of Aspect 14, where the compressible seal is made from a polymer-based material.

Aspect 16 can include, or can optionally be combined with the subject matter of Aspect 14, where the compressible seal is made from one of polypropylene, rubber, or synthetic rubber.

Aspect 17 can include, or can optionally be combined with the subject matter of Aspect 14, the photonic die, integrated heat spreader and optical fibers are immersed in an immersion cooling system.

Aspect 18 can include, or can optionally be combined with the subject matter of Aspect 14, where the compressible seal is a port through which the optical fibers pass and connect with the silicon die.

Aspect 19 can include, or can optionally be combined with the subject matter of Aspect 14, where the latching mechanism is a male-female coupling. Aspect 20 can include, or can optionally be combined with the subject matter of claim 14, where the optical fibers are arranged vertically or horizontally.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus, comprising:
an integrated circuit comprising at least one photonic die;
an optical connection coupled with the integrated circuit;
optical fibers coupled with the optical connection;
a fluid impermeable port coupled with the optical connection, the fluid impermeable port comprising a polymer-based material and having a fluid impermeable port latch comprising the polymer-based material; and
an adapter coupled to the fluid impermeable port, the adapter comprising an adapter latch engaged with the fluid impermeable port, wherein the optical fibers couple with the optical connection within the fluid impermeable port.

2. The apparatus of claim 1, wherein the polymer-based material comprises one of polypropylene, rubber, or synthetic rubber.

3. The apparatus of claim 1, further comprising:
an integrated heat spreader covering the at least one photonic die, wherein the adapter is coupled to the integrated heat spreader.

4. The apparatus of claim 3, further comprising:
a cutout, wherein the optical connection is coupled with the integrated circuit in the cutout.

5. The apparatus of claim 3, wherein the fluid impermeable port latch and the adapter latch comprise a latching mechanism, the latching mechanism comprising one of a male-female engagement, a hook and eye engagement, opposing hooks, a bayonet-type fastener, a hook and roller fastener, or opposing T-shaped hooks.

6. The apparatus of claim 1, further comprising:
an immersion cooling system, wherein the integrated circuit is immersed in the immersion cooling system.

7. An apparatus, comprising:
a photonic silicon die coupled to a substrate;
an integrated heat spreader covering the photonic silicon die and comprising a cutout;
optical fibers in communication with the photonic silicon die through the cutout;
a compressible seal surrounding the optical fibers at a communication point with the photonic silicon die, the compressible seal comprising a polymer-based material and having a fluid impermeable port latch comprising the polymer-based material; and
a latching mechanism engaged with the fluid impermeable port latch of the compressible seal, wherein the compression force provided to the compressible seal is a fluid barrier at the communication point.

8. The apparatus of claim 7, wherein the polymer-based material comprises one of polypropylene, rubber, or synthetic rubber.

9. The apparatus of claim 7, wherein the compressible seal is a port through which the optical fibers pass and connect with the photonic silicon die.

10. The apparatus of claim 7, wherein the fluid impermeable port latch and the latching mechanism comprise a male-female coupling.

11. The apparatus of claim 7, wherein the optical fibers are arranged vertically or horizontally.

12. The apparatus of claim 7, further comprising:
an immersion cooling system, wherein the photonic silicon die, the integrated heat spreader, and the optical fibers are immersed in the immersion cooling system.

13. The apparatus of claim 7, further comprising:
a processor coupled to the photonic silicon die.

14. An apparatus, comprising:
a photonic die coupled to a substrate;
an integrated heat spreader covering the die;
optical fibers in communication with the photonic die;
a port surrounding the optical fibers at a communication point with the photonic die, the port comprising a polymer-based material and having a first latch comprising the polymer-based material; and
an adapter coupled to the integrated heat spreader, the adapter comprising a second latch engaged with the first latch, wherein the port, the first latch, and the second latch provide a fluid barrier at the communication point.

15. The apparatus of claim 14, wherein the polymer-based material comprises one of polypropylene, rubber, or synthetic rubber.

16. The apparatus of claim 14, further comprising:
a cutout in the integrated heat spreader, wherein the port is coupled with the photonic die in the cutout.

17. The apparatus of claim 14, wherein the first latch and the second latch comprise a latching mechanism, the latching mechanism comprising one of a male-female engagement, a hook and eye engagement, opposing hooks, a bayonet-type fastener, a hook and roller fastener, or opposing T-shaped hooks.

18. The apparatus of claim 14, wherein the optical fibers are arranged vertically or horizontally at the communication point.

19. The apparatus of claim 14, further comprising:
    an immersion cooling system, wherein the photonic die, the integrated heat spreader, and the optical fibers are immersed in the immersion cooling system.

20. The apparatus of claim 14, further comprising:
    a processor coupled to the photonic die.

\* \* \* \* \*